United States Patent [19]

Good

[11] 4,221,040
[45] Sep. 9, 1980

[54] METHOD FOR MAKING PELLET FOR CHARGING FURNACES

[76] Inventor: Lewis D. Good, 7579 - 100th St., Caledonia, Mich. 49316

[21] Appl. No.: 930,234

[22] Filed: Aug. 2, 1978

Related U.S. Application Data

[62] Division of Ser. No. 823,589, Aug. 11, 1977, abandoned.

[51] Int. Cl.² .......................................... B23Q 17/00
[52] U.S. Cl. .............................. 29/403.2; 29/420.5; 29/422; 75/44 S; 75/256; 428/576
[58] Field of Search ............ 75/43, 44 R, 44 S, 256; 428/2, 576; 29/403, 420, 420.5, 422

[56] References Cited

U.S. PATENT DOCUMENTS

| | | | |
|---|---|---|---|
| 99,574 | 2/1870 | Jones | 29/403 |
| 654,984 | 7/1900 | Johnson | 75/129 |
| 887,648 | 5/1908 | Kemery | 75/129 |
| 1,119,643 | 12/1914 | Saklatwalla | 75/133 |
| 1,290,143 | 1/1919 | Eppelsheimer | 428/2 |
| 1,354,492 | 10/1920 | Jones | 75/211 |
| 1,848,323 | 3/1932 | Davies et al. | 75/93 G |
| 1,869,925 | 8/1932 | Turnbull | 75/129 |
| 2,025,662 | 12/1935 | Hensel et al. | 75/1 |
| 2,111,344 | 3/1935 | Weitzenkorn | 75/93 |
| 2,150,984 | 3/1939 | Near et al. | 29/4.5 |
| 2,331,074 | 10/1943 | Jones | 75/56 |
| 2,397,418 | 3/1946 | Howard | 75/56 |
| 2,550,735 | 5/1951 | Tour | 75/93 |
| 2,753,262 | 7/1956 | Herres et al. | 75/226 |
| 2,805,146 | 9/1957 | Howard | 75/38 |
| 2,867,895 | 1/1959 | Howell et al. | 29/184 |
| 3,107,166 | 10/1963 | Behr | 75/44 |
| 3,160,502 | 12/1964 | Quartullo | 29/420.5 |
| 3,414,408 | 12/1960 | Eichenberger | 75/214 |
| 3,551,946 | 1/1971 | Bacher et al. | 29/403 |
| 3,626,577 | 12/1971 | Trible | 29/403 |
| 3,774,289 | 1/1971 | Cacace | 29/403 |
| 3,864,092 | 2/1975 | Ravitz | 29/186 |
| 3,877,933 | 4/1975 | Pargeter et al. | 75/129 |

FOREIGN PATENT DOCUMENTS

| | | |
|---|---|---|
| 404608 | 6/1922 | Fed. Rep. of Germany. |
| 20584 | 9/1917 | France. |
| 4543 | of 1902 | United Kingdom. |
| 16802 | of 1912 | United Kingdom. |
| 593822 | 10/1947 | United Kingdom. |

OTHER PUBLICATIONS

*Foundry Trade Journal,* Jun. 2, 1938, pp. 437–438.

*Primary Examiner*—Leon Gilden
*Attorney, Agent, or Firm*—Price, Heneveld, Huizenga & Cooper

[57] ABSTRACT

The specification discloses a compact, dense, economical, metal pellet for charging melting furnaces to recycle the metal and a method for making the pellet especially from scrap cans and pieces of scrap metal including borings, turnings, punchings, chips, shavings, and chunks. The pellet includes a container having compressed, permanently deformed sides and a quantity of compressed metal pieces therein which overlap and engage one another. The container sides include a plurality of folds, wrinkles and corrugations which tightly and firmly engage and clamp the metal pieces to retain them within the compressed container. The pellet may have open or closed ends since the clamping engagement of the metal pieces by the compressed container sides retains the pieces in either case.

The method includes inserting the metal pieces in the container such that they overlap and engage one another and compressing and permanently deforming the container and metal pieces together while the container sides are left unsupported. The resulting folds, wrinkles and corrugations in the container sides clamp and hold the metal pieces which overlap and help retain one another across the entire container.

12 Claims, 13 Drawing Figures

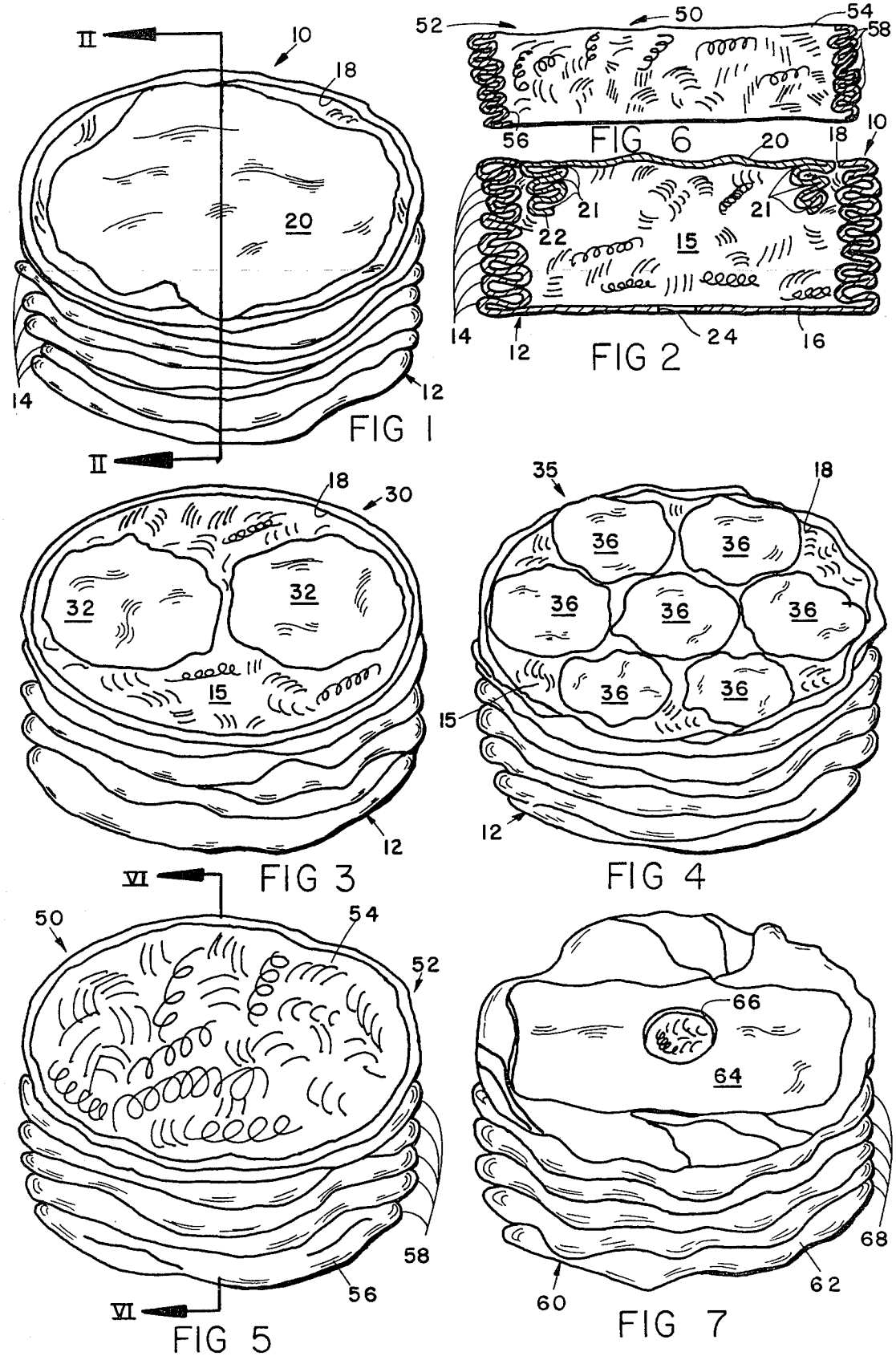

METHOD FOR MAKING PELLET FOR CHARGING FURNACES

CROSS-REFERENCE TO RELATED APPLICATION

This is a division of application Ser. No. 823,589, filed Aug. 11, 1977, now abandoned.

BACKGROUND OF THE INVENTION

This invention relates to furnace charges for recycling metal and a method for making such charges, especially from scrap metal, and, more particularly, to a product and method for forming compact, dense, economical, metal furnace charging pellets especially for reusing scrap metals.

The recycling of scrap metals has become increasingly important due to the dwindling supply of natural resources. A prolific source of recyclable metal is provided by various industries which produce turnings, borings, punchings, chips, chunks and other small pieces of metal of various types as by-products of manufacturing processes. However, problems arise in the collection, handling and use of such small scrap metal pieces.

For metals such as iron and steel, it is necessary to blend scrap metal with quantities of virgin ore and other materials in melting furnaces. Such blending requires the charging of furnaces with predetermined quantities of scrap metal. Such charging requires the provision of scrap in a form which can be easily loaded into melting furnaces, which hold together to provide little or no spillage or loss of metal in transportation, storage, handling or loading, and yet is of sufficient nature to blend and mix well in the furnace when loaded. Moreover, a primary concern in the entire effort of recycling scrap metal is to do so economically.

More specific problems occur in the reuse of small metal pieces such as the turnings, borings and punchings resulting from the manufacture of screws and other machined metal parts. The collection, storage, transportation and loading of such small metal pieces from such processes requires conversion of the pieces into larger masses for ease in handling and loading. Prior methods of such conversion include compaction of the scrap metal into briquets as well as the loading of such scrap into larger containers.

One drawback of briquets which are not encased in some type of container is the loss of scrap from such briquets during handling and loading. It has been proposed to fuse briquets to prevent such loss but such fusion requires complex processes as well as significantly greater amounts of energy usage which of course raises the cost of reusing the scrap. With respect to the encasement of scrap in containers, many methods have been proposed including insertion of scrap into tubular containers which then must be closed to prevent escape of the scrap. With many of such encasement methods, the irregular shape of the individual scrap pieces has required large container volume because of the air spaces between the metal pieces. This increases the costs of storage, transportation and loading because of insufficient density.

In addition, the closing of prior known containers once scrap has been inserted has been a costly and/or difficult previously known process. Many of such prior methods have also failed to adequately retain the metal within the containers. Also, such processes have typically utilized a certain amount of new materials further adding to the cost of recycling the scrap metal.

The present invention has been devised as an improved furnace charging product which overcomes the above problems as well as a method for economically manufacturing such furnace charges to enable recycling of metal pieces which otherwise could not be used.

SUMMARY OF THE INVENTION

Accordingly, the present invention provides a pellet or furnace charge as well as a method for manufacturing such a pellet or furnace charge which is compact, dense, economical and can be made from metal pieces, and especially small scrap metal pieces, and either new or used containers. The pellet or furnace charge is especially designed for ease and economy of manufacture as well as ease and efficiency in storage, handling, transportation and loading with little or no loss of the metal or scrap metal intended for melting or recycling.

In one aspect, the invention provides a metal pellet for charging melting furnaces including a metal container having sides and opposing ends, at least one of the ends being open. A plurality of metal pieces, and especially scrap metal pieces, are within the container and are in overlapping engagement with one another. The container sides are permanently deformed and compressed and include a plurality of folds, wrinkles and corrugations which tightly and firmly engage and clamp portions of the metal pieces which are adjacent and between the folds, wrinkles and corrugations. The metal pieces engage and overlap one another across the entire container as well as between and intermediate the folds, wrinkles and corrugations such that the pieces are securely held and retained within and across the entire area of the container by such overlapping engagement and permanently deformed container sides.

In a preferred embodiment of the invention, a closure member is included in at least the one open end of the container, the closure member preferably being a second container having one open end. The containers are preferably cylindrical with their axes being generally parallel to one another, and are compressed and deformed parallel to their axes such that the folds, wrinkles and corrugations are generally transverse to their axes. This provides a compact, dense pellet in the general shape of a disc. The scrap metal or metal pieces within the container after compression and deformation resist removal because of their interlocking engagement even in the absence of such a closure member.

In another aspect, the invention includes a method for forming a pellet for charging a melting furnace including inserting a quantity of metal pieces in a metal container having sides and an opening in at least one end. The pieces are inserted so that they engage and overlap one another. The method includes compressing and permanently deforming the container and metal pieces together while the sides of the container are unsupported. Thus, the sides become folded, wrinkled and corrugated and engage and clamp portions of the metal pieces firmly and tightly therebetween to form a compressed, densely packed metal mass or pellet with the metal pieces securely retained therein.

The method may be accomplished using converging, endless tracks or ram presses. Preferably, the containers used to form the pellets are scrap metal cans having an opening in one end and are filled with scrap metal pieces such as metal borings, turnings, punchings, shavings or the like collected from various industrial sources.

The present pellet method provides significant advantages over prior known furnace charges and methods for making such charges. The present pellet is a highly compact, dense, concentrated mass of metal which includes minimal fluid pockets or either air or liquid. The pellets are clean and include little or no contaminants since the preferred containers are scrap cans from which the tin or other exterior coating has been melted while the scrap metal pieces are themselves clean and free from contanimants. The interlocking, overlapping engagement of the metal pieces as claimed by the folds, wrinkles and corrugations of the compressed, deformed containers holds the pieces within the container resulting in little or no spillage of the scrap during storage, handling, transportation or loading of the pellets. The pellet is easily recycled because of its dense, concentrated form. Such density allows the pellet to easily penetrate the molten metal in a furnace to an area where mixing and blending is properly accomplished. Moreover, the present invention allows the use of metal scrap which otherwise would not be profitable to recycle or reuse because of the ability to use discarded cans and containers as well as turnings, borings, punchings and other small pieces which are otherwise difficult to collect, handle and reuse.

These and other objects, advantages, purposes and features of the invention will become more apparent from a study of the following description taken in conjunction with the drawings.

BRIEF DESCRIPTION OF THE DRAWINGS

FIG. 1 is a perspective view of a first embodiment of the pellet furnace charge of the present invention including one container having one closed end and a second container closing the opposite end of the first container;

FIG. 2 is a sectional elevation of the pellet of the present invention taken along plane II—II of FIG. 1;

FIG. 3 is a perspective view of a second embodiment of the invention including a pair of compressed cans in the open end of a container filled with metal pieces;

FIG. 4 is a perspective view of another embodiment of the present invention including a plurality of compressed cans filling the open end of the first container;

FIG. 5 is a perspective view of another embodiment of the present invention comprising a compressed container having open ends and being filled with metal pieces;

FIG. 6 is a sectional elevation of the pellet of FIG. 5 taken along plane VI—VI of FIG. 5;

FIG. 7 is a perspective view of a rectangular container filled with metal pieces and compressed to form a disc-like pellet of the present invention;

DESCRIPTION OF THE PREFERRED EMBODIMENTS AND METHOD

Figure 8:
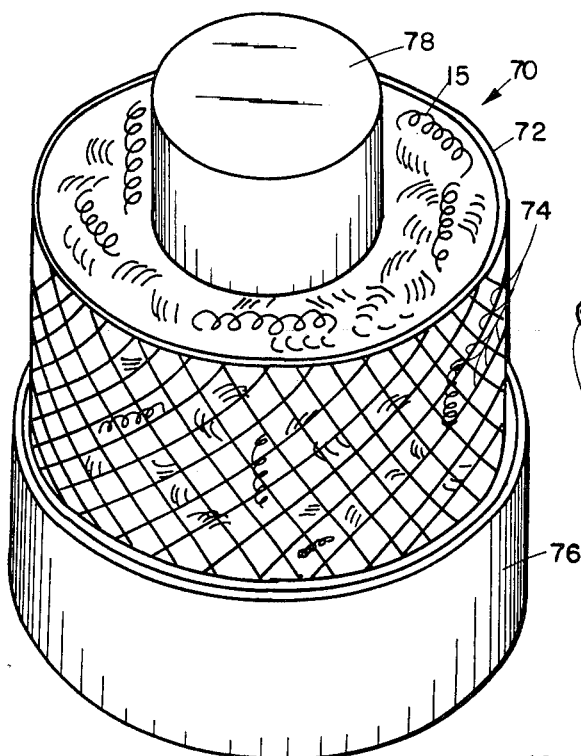
FIG. 8 is a perspective view of several containers assembled prior to compression and permanent deformation to form the pellet of the present invention, one of the containers having mesh sides.

Referring to the drawings in greater detail, FIGS. 1–11 disclose various embodiments of the furnace charge pellet of the present invention. Generally, the invention includes a hollow container or can having one open end filled with metal pieces and thereafter compressed and permanently deformed in pellet form. Generally, the pellets are round or circular-like discs whose widths are greater then their thickness. However, it is not intended that the term "pellets" should be restrictive to round products but rather is a convenient term for reference to the product of the present invention in any ultimate form. Accordingly, the ultimate shape of the pellet in this invention is not critical.

The present invention utilizes at least one metal container or can, preferably a scrap or already used can, which may be one of several different and varying configurations or shapes. Thus, the container may be a right circular cylinder, a rectangular cylinder, a truncated cone or the like as long as it includes at least one opening to the interior thereof. Also, the containers are preferably cleaned prior to use. This may be accomplished by using cans which are burned or heated to remove any contaminants which are burned or heated to remove any contaminants therein and also to melt off and remove coatings of metals such as tin from the underlying metal used to form the cans such as steel.

The metal pieces used in the present invention are generally small scrap metal pieces such as turnings, borings, punchings, chips, chunks and the like obtained from conventional machining operations and processes such as from screw machines, lathes, broaches and the like. These pieces are inserted into and fit within the open metal can or container such that the pieces engage and overlap one another randomly throughout the container. Such overlapping engagement combines with the compressed, deformed can to securely retain the pieces within the can even when no closure member or members are used at the open end of a can. Such retention is referred to herein as a compression lock or interlock of the pieces after formation of the pellet.

As shown in FIGS. 1 and 2, a first embodiment 10 of the present invention illustrates a pellet formed from a right, circular, cylindrical can or container 12. Container 12 has a central axis extending between its ends and generally parallel to its sides before deformation. A plurality of folds, wrinkles or corrugations 14 extending successively upwardly from a base or closed end 16 and are each generally transverse to the central axis. Each of the corrugations, folds or wrinkles is filled with compressed metal pieces 15 which are engaged and held tightly by the adjacent folds or corrugations 14 which clamp metal pieces 15 therebetween. The folded or corrugated sides of container 12 extend upwardly to an open end 18 through which metal pieces 15 are inserted before compression and permanent deformation, and which also receives a closure member which, in embodiment 10, is a second can or container 20. The folds and corrugations are also aligned generally parallel to the central axis after deformation (FIG. 2).

After the first container 12 is substantially filled with metal pieces 15, the second container 20 which, in embodiment 10, is also a right, circular, cylindrical can or container, is placed atop the metal pieces such that its cylindrical axis is generally parallel to that of the first can or container 12. The axes need not be coaxial but should be generally or approximately parallel. Also, the second can or container 20 has a width or diameter slightly less than that of the first container 12. Alternately, the diameter or width of can 20 could be larger than can 12 with can 20 fitting over edge 18 of can 12, the important fact being that one can fits within the other. Thereafter, a compressive force is applied generally parallel to the parallel axes of the containers and against the ends of the containers. The force is sufficient to collapse the containers simultaneously which also compresses the metal pieces within the containers. As is best seen in FIG. 2, such compression folds, wrinkles and corrugates the sides of both containers simultaneously thereby entrapping metal pieces both between the individual corrugations of each container as well as between the corrugated or folded sides of the containers 12 and 20. The folds, wrinkles and corrugations extend transverse to the axis of the cylindrical cans. Further, in embodiment 10, the second container 20 has an open end 22 which is placed in direct engagement with the metal pieces prior to compression such that the open ends 18, 22 are directed toward one another. When containers 20 is smaller than container 12, the compressive force embeds the open end 22 within metal pieces 15 such that the metal pieces overlap and interengage with the corrugations 21 of container 20. In addition, the open end 18 of container 12 is folded over and engages at least portions of the container 20 as shown in FIG. 2. Together, the interlocking engagement of the corrugated sides 21 of container 20 and the overlapping engagement of the end 18 with container 20 retain container 20 in the open end of container 12 and retain the metal pieces 15 within containers 12 ad 20. Such retention is enhanced across the entire width of the container 12 by the overlapping, interengaging positions of the metal pieces thereacross beginning within corrugations 14 at the sides of container 12. The clamping force provided by such corrugation is transferred across the entire width by and to the overlapping metal pieces to retain the pieces therein.

As will be appreciated, the thickness of the metal of the sides of containers 12, 20 should be thick enough to retain the corrugations in the permanently deformed sides after compression but not so thick as to prevent the compression of the containers. Typically, a compressive force of 30-50 tons applied with one of the mechanisms described hereinafter to the filled containers in a direction parallel to the cylindrical axes of the containers will be sufficient to properly deform the containers and form the pellet 10.

A punched hole or other aperture 24 may be provided in the base 16 of container 12 when no other openings are provided in the container to allow the escape of any fluids or air within the metal pieces 15 or container 12. Such fluids would otherwise become entrapped within the pellet 10 after compressive formation.

As seen in FIG. 2, the base of second container or can 20 and the deformed edge of opening 18 of container 12 will generally be flush after formation of the pellet. Formation uniformly compresses the metal pieces into a dense, concentrated metal mass within the containers which take the shape of a disc after compression.

Referring now to FIGS. 3 and 4, embodiments 30 and 35 of the pellet or pelletized furnace charge are illustrated. Embodiment 30 is similar to embodiment 10 but includes a pair of closure containers 32 which help close the open end of the primary container 12. Containers 12 and 32 are preferably right, circular, cylindrical cylinders with container 32 being placed atop the metal pieces 15 within container 12 prior to compressive deformation. Upon compression, containers 32 are imbedded within the metal pieces and are engaged by the edges of the opening 18 of container 12 for retention. The compressive lock or interlocking engagement of the metal pieces across the width of the container 12 due to the corrugation, folds and overlapping engagement of the pieces themselves retains pieces 15 within the open end 18 even where the compressed containers do not reach or cover.

Embodiment 35 shown in FIG. 4 is similar to embodiments 10 and 30 except that it includes even secondary containers all of which have diameters or widths smaller than the opening 18 of primary container 12. Containers 36 are each preferably right circular cylindrical cans such as beer cans placed with their ends having openings therein downwardly against the metal pieces 15 and arranged within the opening 18 of container 12. Upon compression, containers 36 are embedded within the metal pieces in much the same fashion as container 20 in embodiment 10. Containers 36 overlap and engage one another and at edges 18 of container 12 for retention of the metal pieces within the containers after such compression.

Figure 10:
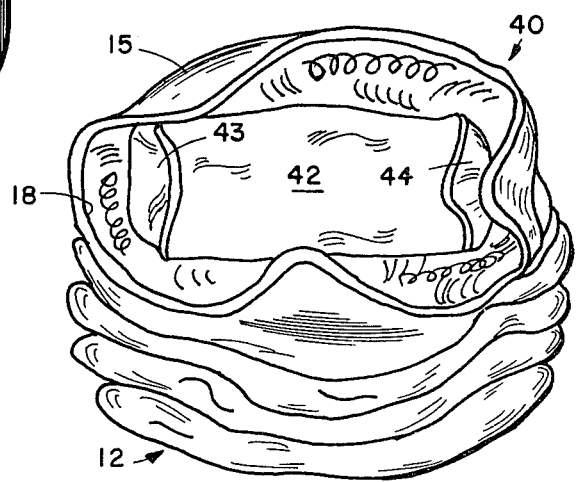
FIG. 10 is a perspective view of yet another embodiment of the pellet of the present invention including a second container laid sideways across the open end of a first container and crused therein.
Figure 11:
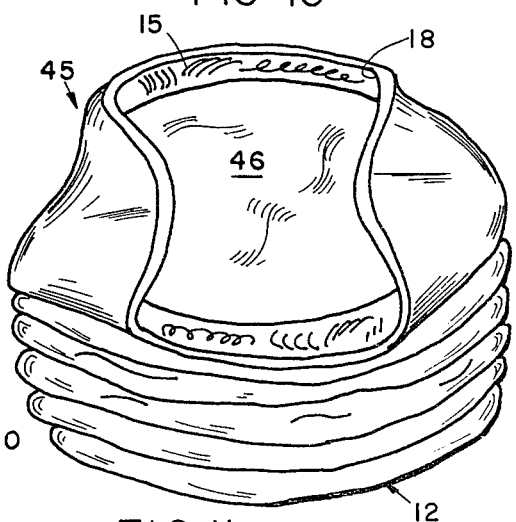
FIG. 11 is a perspective view of another embodiment of the present invention including a planar closure member at the open end of the container.

As shown in FIGS. 10 and 11, embodiments 40 and 45 of the pellet of the present invention may include differing closure members placed atop the metal pieces and within the edge 18 defining the open end of container 12. In embodiment 40, a secondary cam 42 serving as a closure member is placed atop the metal pieces 15 after they are inserted in container 12. In this case, container 42 is a right, circular, cylindrical can having two closed end or substantially closed ends 43, 44 although a small opening or openings may be present in one or both ends. The cylindrical axis of container 42 is positioned transverse to the axis of the primary container 12. Upon application of the compressive force to the side of can 42 and generally transverse to its axis but parallel to the axis of container 12 container 42 is crushed and slightly embedded within pieces 15 with open edge 18 of container 12 folded in and overlapping at least portions of crused can 42. The interlocking engagement of the metal pieces and corrugations 14 of container 12 retains the metal pieces within the open end of the container 12 outside the bounds of crushed can 42.

As shown in FIG. 11, embodiment 45 of the pelletized furnace charge includes a planar disc-like piece of sheet metal 46 such as a separated can top or the like having a diameter generally similar to that of the right, circular, cylindrical, primary container 12. Closure 46 is placed atop metal pieces 15 after insertion in primary container 12 at compressive force applied parallel to the axis of container 12. After compression, the edges 18 of the opening in can 12 are folded over and retain closure 46 atop the metal pieces. In each embodiment 30, 35, 40 and 45, the primary containers 12 include bases or bottoms 16 as in embodiment 10.

Referring now to FIGS. 5 and 6, embodiment 50 of the pelletized furnace charge is shown including a right circular cylindrical container or can 52. Can 52 has two opposing open ends 54, 56. When placed upright on a planar support and filled with metal pieces 15 as in the other embodiments, container 52 may then be compressed, permanently deformed and crushed while unsupported which allows the sides thereof to be formed into folds, wrinkles and corrugations 58 as illustrated. As with the other embodiments, metal pieces 15 are entrapped between and within the corrugations 58 and overlapping engage one another across the extent of the container 52 to securely clamp and interlock with one another in the compression lock described above. When completed, pellet 50 retains the metal pieces therein without the requirement of any closure member on either open end 54, 56 of the container. It is preferred with embodiment 50 that slightly larger size metal pieces be used than in the embodiments where closures for the open ends are included. Coarser metal chips or the like having a dimension of $\frac{1}{2}$ to $\frac{3}{4}$ inch or greater have been found useful in this embodiment. These size pieces provide better overlapping engagement.

As shown in FIG. 7, other shapes of containers than right, circular, cylindrical containers may be used to form the furnace charging pellets of the present invention. Embodiment 60 of FIG. 7 is formed from a rectangular, cylindrical container or can having a rectangular sectional shape. Container 62 of embodiment 60 has a rectangular top 64 as well as a rectangular bottom. At least one of the top and bottom includes an aperture into the interior of the hollow container such as at 66 in top 64. Metal pieces having a maximum dimension smaller than the size of aperture 66 are inserted into the can through that aperture after which the filled container is compressed and crushed as discussed above with the other embodiments. During such compression, the originally rectangular can takes on a circular shape as shown in FIG. 7 and the sides are folded, wrinkled and corrugated at 68 to produce a disc-like pellet as with the other embodiments. Even though the compressive force may split open a side of the rectangular can during compression, the interlocking engagement of the metal pieces within the container as clamped by the corrugations 68 retains the metal pieces securely within the container at the split opening.

Figure 9:
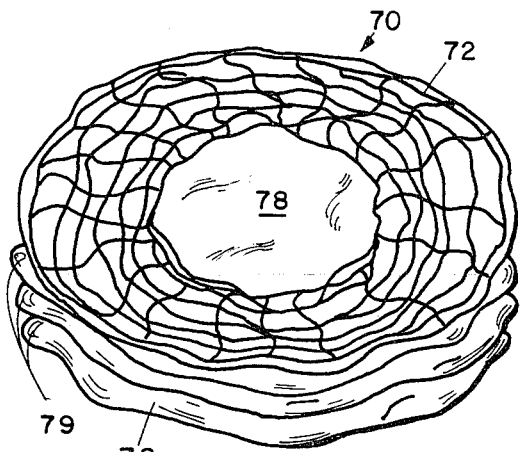
FIG. 9 is a perspective view of the pellet shown in FIG. 8 after compression and permanent deformation.

As shown in FIGS. 8 and 9, embodiment 70 of the pellet utilizes a netting or wire mesh cylinder 72 having opposing open ends and a plurality of side openings of a predetermined maximum dimension 74. Metal pieces 15, a major portion of which have at least one dimension larger than the maximum dimension of the opening 74 in mesh cylinder 72, are poured or inserted within an open end of the cylinder 72 after the opposite end of the cylinder has been inserted in a base container or can 76 having a closed bottom, upstanding sides and an open end receiving the cylinder 72. Alternately, the bottom of the mesh cylinder 72 could be placed on a planar support, although the short container 76 having a solid bottom and upstanding sides is preferred. Thereafter, a smaller container or can 78 having a closed bottom and an open end is placed atop the metal pieces within the mesh cylinder 72. Can or container 78 is also preferably right, circular, and cylindrical as is mesh cylinder 72 and the axes of cylinders 72 and 78 are generally parallel although they need not be coaxial when assembled. Upon the application of compressive force, the combination of containers 72, 76, and 78 including metal pieces 15 therein, are permanently deformed into a disc-like pellet 70 as shown in FIG. 9. The netting or mesh of the wire cylinder, as well as the sides of containers 76 and 78 are deformed, folded and compressed in corrugations 79 and overlap the interengaged metal pieces. Pieces 15 are also engaged within the corrugations of containers 76 and 78 for retention within the pellet.

In any of the embodiments 10, 30, 35, 40, 45 and 70 which utilize a secondary container placed atop the metal pieces for combination with the primary container, the secondary container preferably includes one open end and one closed end. It is preferred that the open end of the secondary container be placed against the metal pieces although this is not absolutely necessary. However, when two right circular cylindrical cans of complementary diameter are used, compressive force applied parallel to the axes of both cans facilitates retention of the metal pieces within the cans because of the transversely formed corrugations which clamp and interlock the overlapping metal pieces.

It has been found in actual manufacture of the various embodiments described above that cans and containers of various sizes may be used. For example, cans having widths or diameters in the range of approximatey 2 to 10 inches and filled with varying sizes of scrap metal pieces have produced excellent pellets. For those pellets without closure members, such as embodiment 50, larger metal pieces with at least one dimension of $\frac{1}{2}$ to $\frac{3}{4}$ inches are preferred. With mesh containers such as embodiment 70, a major proportion of pieces having a dimension greater than that of the mesh openings, but still small enough to fit within the mesh container such as elongated turnings or borings are preferred.

Figure 13:
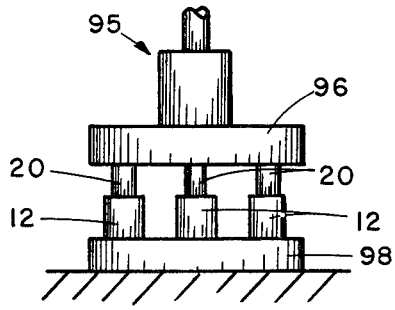
FIG. 13 is a schematic illustration of another method of applying compressive pressure to form the pellets of the present invention.
Figure 12:
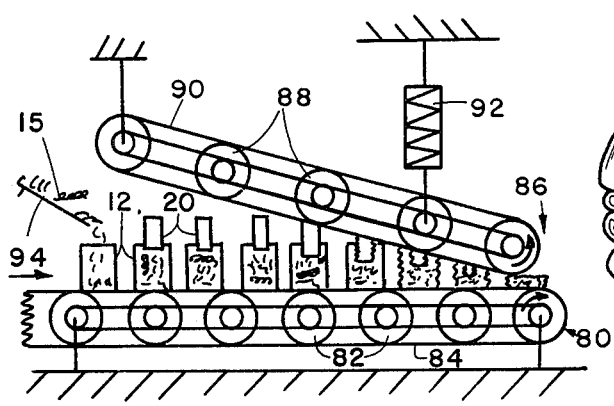
FIG. 12 is a schematic illustration of one method of compressing and permanently deforming the filled containers to form the pellets of the present invention.

Referring now to FIGS. 12 and 13, alternate methods for manufacturing the pelletized furnace charges from scrap containers and metal pieces will be understood. In one method, a lower, support conveyor 80 is secured above a support surface and includes a plurality of support rollers 82 movably supporting an endless conveyor 84 therearound. Conveyor 80 moves in a rectilinear path. In opposition to conveyor 80, a conveyor 86 is provided including support rollers 88 and another endless conveyor 90 supported therearound. Conveyor tracks 84, 90 may be formed from rigid, pivotally interconnected links extending across the width of the conveyor such that the conveyors follow a curved path around the end support rollers. Conveyor 86 is supported in a converging manner with respect to conveyor 80 above conveyor 80 and includes a biasing or spring mechanism 92 to force conveyor 86 toward conveyor 80. Conveyor 86 converges from above the input end of conveyor 80 above the height of the uncompressed filled containers to the thickness of the compressed pellet.

The converging conveyors are operated by placing a succession of upright, hollow containers having at least one open end on the lowermost conveyor track 84. The open ends of the containers extend upwardly. A chute 94 pours clean, scrap metal pieces into the open ends of the successive containers with the excess being collected at the sides of the conveyors and returned to chute 94 for insertion in later containers. The pieces overlap and engage one another within the containers. Thereafter, the secondary container or closure member 20 is placed atop the filled container 12 with its axis generally parallel to that of container 12 and the combination of containers proceeds into engagement with the upper conveyor track 90. The biasing force of mechanism 92 holds conveyor 86 downwardly against the succession of filled containers while the moving tracks 84, 90 continue to move the filled containers into the ever-decreasing space between the conveyors. Such movement applies a compressive force parallel to the axes of the containers. Because the containers are unsupported at their sides, the above described folding, wrinkling and corrugation as well as the compression of the metal pieces within the containers results.

An alternate method for compressing and deforming the filled containers is shown in FIG. 13 including a press or ram 95 having an upper reciprocal platen 96 and a lower fixed platen 98. Filled container assemblies including primary and secondary containers 12, 20 and metal pieces 15 are placed between the plantens and the ram is actuated with a pressure of 30-50 tons to crush, squeeze, compress and deform the container combinations into the pellets as described in the above embodiments.

Accordingly, the present pelletized furnace charge provides a highly concentrated, dense metal mass in disc-like form which is easily transported, handled, stored and loaded into melting furnaces with little or no loss of the scrap metal pieces therewithin. The present method provides a highly economical manufacturing process using discarded or otherwise waste containers and scrap metal to provide recycling for otherwise unusable material.

While several forms of the invention have been shown and described, other forms will not be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. A method for forming a pellet for charging a melting furnace comprising the steps of:
    (1) inserting a quantity of metal pieces in a metal container having generally straight, unfolded, uncorrugated sides and an opening in at least one end such that said pieces engage and overlap one another within the container;
    (2) compressing and permanently deforming said container and metal pieces together by applying a force to said container and metal pieces generally parallel to said container sides while the sides of said container are unsupported such that said sides become folded, wrinkled and corrugated and engage and clamp portions of said metal pieces firmly and tightly therebetween whereby said pellet is a compressed, densely packed metal mass with said metal pieces securely retained therewithin and across the entire container by overlapping engagement with one another and with said folds, wrinkles and corrugations.

2. The method of claim 1 wherein said container is cylindrical and has a central axis; said compressing and deforming including compressing and deforming said container by applying compressive pressure generally parallel to said container axis whereby said folds, wrinkles and corrugations extend generally transverse to said axis.

3. The method of claim 2 including placing at least one other container on said metal pieces within said container, said other container having sides and at least one open end; and compressing and permanently deforming said containers and metal pieces together such that said other container is also folded, wrinkled and corrugated and is at least partially embedded within said metal pieces and engages the first of the said containers.

4. The method of claim 3 wherein said other container is cylindrical and has a central axis; said other container being placed on said metal pieces such that said container axes are generally parallel, said compressing and deforming including compressing and permanently deforming both containers by applying compressive pressure against said containers generally parallel to both of said container axes whereby said folds, wrinkles and corrugations in both containers are generally transverse to said axes.

5. The method of claim 4 including placing said one open end of said other container against said metal pieces prior to said compression and permanent deformation.

6. The method of claim 4 including compressing and deforming said containers and metal pieces together with a pair of opposing, converging, endless conveyors, said compressing including continuously crushing said containers between opposing surfaces of said converging conveyors while moving said containers along the path of said conveyors.

7. The method of claim 1 including placing a closure member on the metal pieces in said container after said metal pieces have been inserted, and compressing and permanently deforming said container, metal pieces and closure member together such that said closure member, said quantity of metal pieces and said compressed container are retained together.

8. A method for forming a pellet for charging a melting furnace comprising the steps of:
    (1) inserting a quantity of metal pieces in a metal container having sides and an opening in at least one end such that said pieces engage and overlap one another within the container;
    (2) placing a closure member on the metal pieces in said container after said metal pieces have been inserted;
    (3) compressing and permanently deforming said container, metal pieces and closure member together while the sides of said container are unsupported such that said sides become folded, wrinkled and corrugated and engage and clamp portions of said metal pieces firmly and tightly therebetween and said closure member, metal pieces and compressed container are retained together whereby said pellet is a compressed, densely packed metal mass with said metal pieces securely retained therewithin and across the entire container by overlapping engagement with one another and with said folds, wrinkles and corrugations;
    said closure member being another container having sides and at least one open end; said compressing and permanently deforming step including compressing and permanently deforming said containers and metal pieces together such that said other container is also folded, wrinkled and corrugated and is at least partially embedded within said metal pieces and engages the first of the said containers.

9. The method of claim 8 including placing a plurality of said other containers on said metal pieces within said container prior to said compression and permanent deformation.

10. The method of claim 1 including compressing and deforming said container and metal pieces together with a pair of opposing, converging, endless conveyors, said compressing including continuously crushing said container between opposing surfaces of said converging conveyors while moving said container along the path of said conveyors.

11. The method of claim 10 including placing a plurality of successive containers on the lowermost one of said conveyors with the open container ends directed upwardly; and pouring said metal pieces into the open container ends prior to engagement of the open ends of said containers by the uppermost conveyor.

12. The method of claim 1 including compressing and deforming said container and metal pieces together by crushing with a ram.

* * * * *

UNITED STATES PATENT AND TRADEMARK OFFICE
CERTIFICATE OF CORRECTION

PATENT NO. :  4,221,040
DATED    :  September 9, 1980
INVENTOR(S) :  Lewis D. Good It is certified that error appears in the above-identified patent and that said Letters Patent are hereby corrected as shown below:

Column 6, line 21:
"even" should be --seven--

Column 9, line 29:
"not" should be --now--

Signed and Sealed this

Twentieth Day of January 1981

[SEAL]

Attest:

RENE D. TEGTMEYER

Attesting Officer      Acting Commissioner of Patents and Trademarks